Patented Sept. 5, 1939

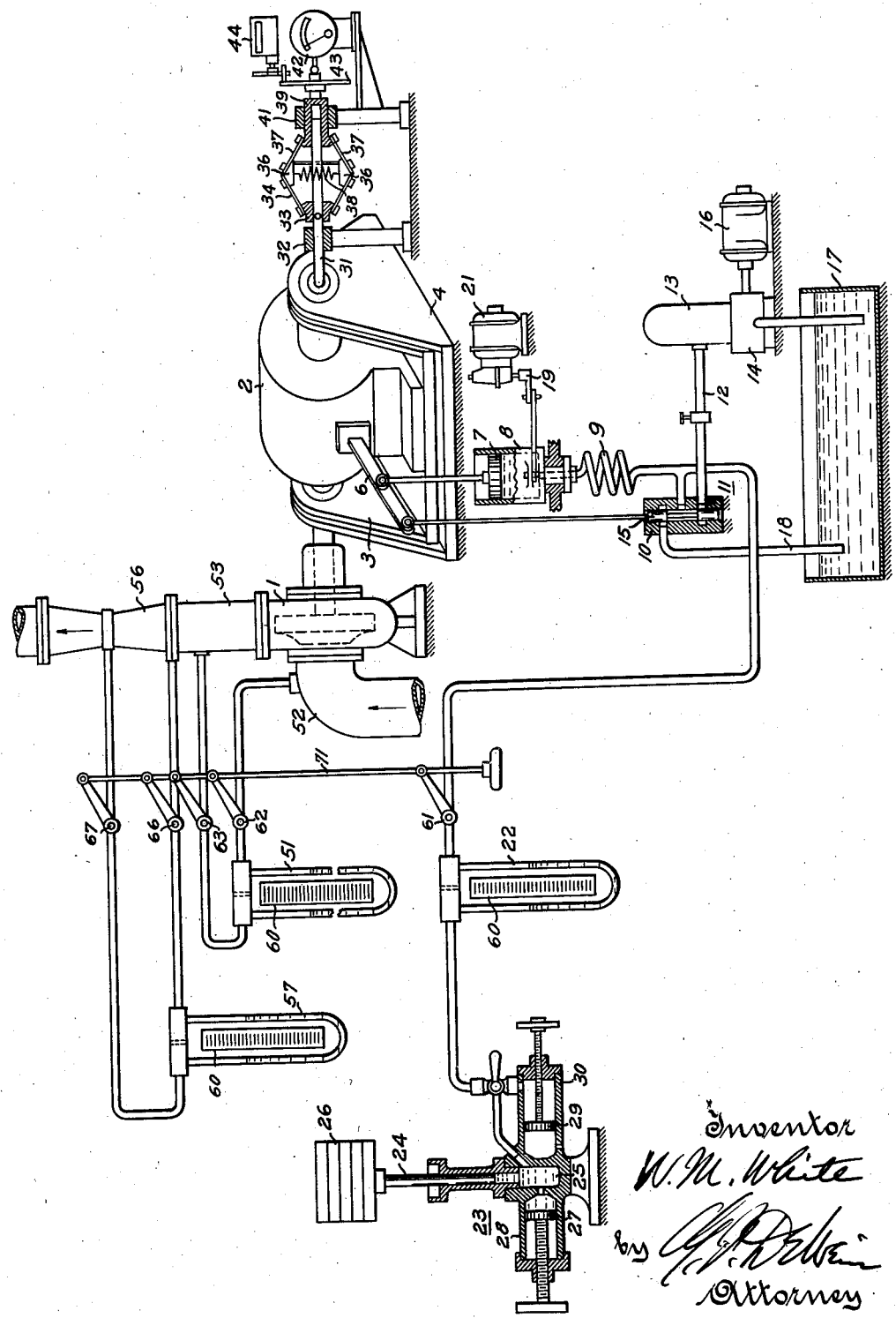

2,172,095

UNITED STATES PATENT OFFICE 2,172,095

PUMP-TESTING SYSTEM

William M. White, Milwaukee, Wis.

Application November 23, 1936, Serial No. 112,302

27 Claims. (Cl. 265—25)

This invention relates to improvements in systems and the component parts of systems for testing machines and more particularly to a machine for determining the operating characteristics and efficiency of any rotary machine such as a centrifugal pump which operates on or is operated by a fluid passing therethrough.

In determining the operating characteristics of rotary hydraulic apparatus such as centrifugal pumps, it is necessary to determine, with the highest degree of accuracy possible, at least (1) the quantity of water delivered by the pump in gallons per minute, (2) the total dynamic hydraulic head across the pump in feet and (3) the speed of revolution of the pump in minutes. Determination of the efficiency of the pump also requires that (4) the amount of power supplied for actually driving the pump be determined as accurately as possible by determining the reaction of the driving machine which value is read in pounds. An authoritative specification for the testing of pumps requires that the speed of operation during the test shall always be maintained as nearly constant as possible and that each of the various measurements for a given test run shall be computed by averaging a series of instantaneous readings of all of the measurements taken simultaneously. It is further required that the values of the above four quantities be read only when the several quantities have become constant.

Another desirable feature in testing systems is that the values of all of the quantities to be measured be measured only by primary standards of dimension and weight. But such primary methods of measurement are, at least in part, impractical particularly when pumps for very high capacity or very high head are to be tested. Measuring instruments which are very sensitive, which adjust themselves automatically and which may be readily calibrated by primary standards must accordingly be used to attain so-called secondary measurements or measurements of the effect of quantity or of the rate of flow or of speed. Thus the quantity of water delivered by the pump may be measured by determining the rate of flow through a Venturi tube having a manometer tube rather than a pressure gauge connected therewith. If the speed of the pumps is to be kept constant, a source of power must be provided which is not subject to any degree of fluctuation whatever and which can be readily measured. Even the best frequency control devices employed in the usual electric power systems do not provide a sufficiently constant speed regulation and special means such as a piezo-electric crystal must be employed if a properly constant speed is to be obtained. Such a special frequency control means is not, however, available without excessive cost and cannot be transported for use at points at which the pumps are generally installed and at which tests are to be made on such pumps after installation thereof.

Means must accordingly be provided which will obviate the necessity for obtaining a constant speed operation of the machine under test while permitting the simultaneous measurement of all of the required quantities when such quantities are at a constant value for the particular test conditions under consideration.

It is therefore among the objects of the present invention to provide means for determining physical values related to the operation of a machine whereby the operating characteristics of the machine may be determined.

Another object of the present invention is to provide a system for determining the operating characteristics of a rotary machine operating on or operated by a fluid.

Another object of the invention is to provide a system for testing rotary pumps by which the indications of all of the measuring instruments in the system may be fixed at the same instant for reading at leisure.

Another object of the invention is to provide a system for testing centrifugal pumps in which constant value readings of all of the measuring instruments may be obtained without driving the pump under test at constant speed.

Another object of the invention is to provide a testing system for pumps in which the instantaneous speed of operation of the pump under test may be determined and in which all measuring instruments may be locked simultaneously to secure readings of such instruments at the same instant.

Another object of the invention is to provide a pump testing system in which the reaction of a dynamometer for determining the power which is supplied to the pump, is measured by means of an adjustable series of weights in combination with a manometer for measuring reaction variations coming between the several weights of the series.

Another object of the invention is to provide a machine testing system in which the driving machine for the pump under test is provided with speed responsive means by which the instantaneous speed of such machine may be accurately and continuously determined.

Objects and advantages other than those set forth above will be apparent from the following description when read in connection with the accompanying drawing which, somewhat diagrammatically, illustrates one embodiment of the invention in which a pump under test is driven by an electric motor mounted on a cradle dynamometer and in which the reaction of the dynamometer and the values of the fluid passing through the pump are obtained by pressure difference indicating manometers which are simultaneously controlled by a single means for operating a multiple or plurality of valves.

Referring more particularly to the drawing by characters of reference, the reference numeral 1 designates a machine to be tested and which is herein shown as a centrifugal pump of which the operating characteristics and the efficiency are to be determined. The pump is driven by an energy translating device such as an electric motor 2 mounted in a cradle 3 which is itself mounted in a stand 4. The cradle and the stand together form a portion of a dynamometer with the cradle mounted in the stand and the motor mounted in the cradle in such manner, well known in the art, as to substantially eliminate all static friction and to counterbalance the running friction of the several contacting portions of the bearings against each other. An arm 5 extends from the cradle or from the motor at right angles to and in a plane through the longitudinal axis through the motor. The arm has attached thereto a piston 7 movable within a cylinder 8 to which a fluid under pressure is supplied by way of a pipe 9, a control valve 11 and a pipe 12, from a pressure tank 13 in which a predetermined pressure is maintained by a pump 14 driven by a motor 16 and in which the pump draws the fluid to be maintained under pressure from a sump 17. The control valve 11 comprises an internally cylindrical casing 10 and a valve member 15 having pistonlike enlargements at the ends thereof, controlling the flow of fluid pressure from the pipe 12 to the pipe 9 and also controlling the discharge of fluid pressure to the sump 17 from the cylinder 8 by way of the valve 11 and a discharge pipe 18. The purpose of the pump 14 and of the valve 11 is to produce and maintain a pressure within the cylinder 8 under the piston 7 and to maintain such pressure within close limits, thus initially statically balancing the cradle 3 and all parts carried thereby and limiting the movement of the cradle 3 during operation of the entire system, to not more than a few thousandths of an inch, thereby minimizing the error producing effect of friction in the cradle bearings and of imperfect flexibility in the power supply connections to the motor 2. Variations in movement of the motor 2 and cradle 3 beyond predetermined limits, dependent on the construction of valve 11, are resisted by pressure admitted by movement of the valve from the pump 14 to the underside of piston 7 thus keeping the movement of the cradle down to a relatively small amount.

The cylinder 8 is oscillated at a slow rate of speed through a suitable drive 19 by a motor 21 to eliminate the possibility of the sticking of piston 7 in cylinder 8 and to replace the static friction of the contacting surfaces thereof by the lesser dynamic friction between the cylinder wall and the piston surfaces when such wall and such surfaces are in relative movement. The reaction of the main or driving motor 2 on the cradle 3 is transmitted to the fluid in the cylinder 8 and tends to compress such fluid which is already under pressure from the pump 14. Such fluid pressure is transmitted to one leg of a mercury pressure manometer 22 of which the other leg is connected to a well known type of dead weight gauge tester shown generally at 23 and comprising a piston 24 movable within a cylinder 25, the piston being formed for loading by weights 26 to vary the counterbalancing effect of such weights on the pressure initially applied to the manometer 22, which manometer will be hereinafter designated as the torque manometer. It will be understood that the piston 24 and the weights 26 of the gauge tester 23 may be rotated manually or automatically to eliminate the possibility of sticking of such piston in the cylinder and to decrease the friction between the engaging surfaces thereof. The gauge tester in addition to the piston 24 and the cylinder 25 is also provided with a manually adjustable piston 27 operable within a cylinder 28 by which the pressure in the cylinder 28 may be initially adjusted and is also further provided with a piston 29 movable within a cylinder 30 by which fluid may be supplied to cylinder 25 to make up leakage therefrom along the stem of the piston 24.

The pressure supplied by the pump 14 to the cylinder 8 is so chosen as to resist the tendency toward rotation of the driving motor 2 and such movement of the driving motor 2 is thus translated into pressure which is transmitted to the torque measuring manometer 22. The value of the weights 26 is so chosen as to counterbalance at least the major portion of the fluid pressure from the cylinder 8 to the manometer 22 and the menisci of the columns of mercury in the legs of the manometer 22 are therefore substantially level when the driving motor is in normal no load operation. When the reaction of the driving motor changes, due to changes in the load thereon, the pressure of the fluid in cylinder 8 due to the operation of pump 14 and the pressure exerted on the fluid by the weights 26 of the gauge tester 23 remaining constant, the levels of the mercury columns of the torque measuring manometer 22 also change relative to each other and by an amount depending on the change in the motor reaction. Due to the fact that the gauge tester 23 counterbalances the major portion of the pressure due to reaction from the driving motor 2, the bore of the manometer 22 may be made as small as desired, thus providing for a wide variation in the measuring level for a change in position of the motor 2 of as little as one thousandth of an inch. The manometer 22 thus acts as a vernier by which minute changes in torque of the motor may be read with a high degree of accuracy.

To secure really comparative results in the several trials of a test run on the machine 1, it is essential that the speed of operation of the driving motor 2 be known very accurately. A device in the nature of the well known flyball governor is accordingly driven by the motor 2 and is connected with means for visually indicating very minute changes in motor speed and is connectable with means for actually counting the revolutions per minute of the motor. As shown herein, the shaft of driving motor 2 is connected directly or by any suitable positive driving means with a spindle 31 mounted in a suitable bearing 32. Fixedly mounted on the spindle 31 is a collar 33 to which are attached two sets of a plurality of spaced leaf springs 34. Weights 36 are secured to the ends of the sets of springs 34 and have severally attached thereto a set of leaf springs 37, the weights being joined directly by the helical springs 38. The ends of spring sets 37 are connected to a cylinder 39 mounted in a bearing 41 and having the spindle 31 extending thereinto to allow for relative movement of the spindle and the cylinder. As speed changes of the driving motor 2 take place, the weights 36 are thrown outward by centrifugal force or drawn inward by the action of the helical springs 38 to cause longitudinal movement of the cylinder 39 which movement acts on a visual indicator 42 by which the change of speed and hence the instantaneous speed of the driving motor 2 may be determined. The connection between the cylinder 39 and the indicator 42 is preferably provided with a flange 43 by which connection may be made, intermittently as desired or continuously and in a well known manner, with the usual type of speed counter 44 to determine the actual number of revolutions per minute of the driving motor 2.

The dynamic fluid head across the pump is determined by connecting one leg of a mercury manometer 51 with the suction line 52 of the pump 1 and by connecting the other leg of the head measuring manometer 51 with the discharge line 53 of the pump. The manometer 51, in view of the fact that the specific gravity of mercury is only 13.6 at ordinary temperatures, requires approximately one inch of mercury for each foot of head on the pump and the manometer is accordingly of considerable length when pumps under relatively high head are to be tested. The manometer is accordingly herein shown as broken to avoid complicating the drawing by attempting to illustrate the relative length of such manometer. Due to the fact that the menisci of such manometer may be read accurately to within at least one-sixteenth of an inch, it is possible to determine the head on the pump to within at least one-tenth of one percent of the value of such head. The quantity of water delivered by the pump 1 is determined by measuring the velocity of water discharged by the pump through a Venturi tube 56 to which is connected a mercury manometer 57, the one leg of which is connected with the larger cross-section of the Venturi tube while the other leg of the manometer is connected with the smaller cross-section of the Venturi tube in the usual manner. Reading of the differences in pressure acting on the several legs of the manometer 57 then allows calculation in the usual manner of the gallons per minute discharged by the pump.

The connection of the torque manometer 22 with the dynamometer cylinder 8 is controlled by a cock 61, the connections of the head measuring manometer 51 with the suction line of the pump 52 and with the discharge line 53 of the pump are severally controlled by cocks 62 and 63, respectively, and the connections of the quantity measuring manometer 57 with the Venturi tube 56 are severally controlled by cocks 66 and 67. All of the five cocks above mentioned are pivotally interconnected by a single rigid bar or rod 71 and are preferably so located as to allow the operator of the system to observe the visual speed indicator 42 before and at any time during the operation of the cocks by the operating rod 71. Due to interconnection of the several cocks by a single operating means, the connections of the several manometers with their sources of pressure to be measured may be simultaneously interrupted, thus fixing all of the several manometer readings at the points severally attained at the instant at which the connections are interrupted. Such fixing of the instantaneous manometer readings then permits the operator or operators of the test system to directly read the several manometers at leisure and with any desired degree of exactness without introducing the complication of and the possibility of errors in recording instruments.

In operation, cocks 61 to 67 are open and the pump 1 and the main or driving motor 2 are brought up to the desired operating speed which may be determined by use of the speed counter 44. Auxiliary motors 16 and 21 are started to supply pressure to tank 13 and to oscillate the cylinder 8. The previously determined pressure is supplied from tank 13 to cylinder 8 which maintains the motor 2 and the cradle 3 of the dynamometer in a predetermined position so long as no change takes place in the pump operating conditions, the valve 11 remaining closed under such static condition. The pressure transmitted to the torque measuring manometer 22 from the cylinder 8 is then balanced as nearly as is practical by the pressure from the gauge tester 23 which pressure is produced by adding weights 26 until the menisci level of the two mercury columns in the manometer 22 stand as nearly as possible at the same level. The operator then takes his position at the cock operating rod 71 and observes the speed indicator 42 until the speed of the driving motor 2 has remained constant for a sufficient length of time to allow all of the manometer levels to reach the stable position for the predetermined speed of the motor. The rod 71 is then operated to close all of the cocks 61 to 67, inclusive, simultaneously whereupon notations are made of the speed and of all of the manometer readings. Such observations of the operation of the system are made a sufficient number of times to allow a good average to be obtained without the use of any readings differing widely from such average.

It will, of course, be understood that the several manometers may be filled with any fluid which is immiscible with the fluid in the torque balancing system and with the water or other fluid passing through the pump 1, other than mercury provided such fluid has the property of providing a clearly defined meniscus at its unconfined surfaces.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for determining the operating characteristics of a machine, an energy translating device connected with said machine, means connected with and for measuring the torque of such device, a plurality of means connected with and for measuring physical values related to the operation of said machine, and means for simultaneously fixing the readings of a plurality of said means by interruption of the connections thereof.

2. In a system for determining the operating characteristics of a machine having a fluid passing therethrough, an energy translating device connected with said machine, means connected with and for measuring the torque of said device, means connected with and for measuring a plurality of fluid pressure differences corresponding to a plurality of conditions in the operation of said machine, and means for simultaneously fixing the readings of all of said pressure differences by interruption of the connections of all of said measuring means.

3. In a system for determining the operating characteristics of a machine having a fluid passing therethrough, an energy translating device connected with said machine, means connected with and for measuring the torque of said device, means connected with and for measuring the rise in pressure of the fluid passing through said machine, means connected with and for measuring the quantity of fluid passing through said machine, and means for simultaneously fixing the readings of all of said measuring means by interruption of the connections thereof.

4. In a system for determining the operating characteristics of a machine having a fluid passing therethrough, an energy translating device connected with said machine, a movable mounting for said device, means connected with and for measuring the movement of said mounting to determine the torque of said device, means connected with and for measuring the rise in pressure of the fluid passing through said machine, means connected with and for measuring the quantity of fluid passing through said machine, and means for interrupting the connections of and simultaneously fixing the readings of all of said measuring means.

5. In a system for determining the operating characteristics of a machine having a fluid passing therethrough, an energy translating device connected with said machine, a movable mounting for said device, means for translating the movement of said mounting into pressure, means connected with and for measuring the pressure produced by said translating means, means connected with and for measuring the rise in pressure of the fluid passing through said machine, means connected with and for measuring the quantity of fluid passing through said machine, and means for interrupting the connections and simultaneously fixing the readings of all of said measuring means.

6. In a system for determining the operating characteristics of a machine having a fluid passing therethrough, an energy translating device connected with said machine, a movable mounting for said device, a cylinder located adjacent said mounting, a piston connected with said mounting and movable within said cylinder, means connected with and for obtaining a predetermined pressure within said cylinder, means connected with and for measuring the variations in pressure produced by movement of said piston within said cylinder, means connected with and for measuring the rise in pressure of the fluid passing through the machine, means connected with and for measuring the quantity of fluid passing through said machine, and means for interconnecting all of said means and simultaneously fixing the readings of all of said measuring means.

7. In a system for determining the operating characteristics of a machine having a fluid passing therethrough, an energy translating device connected with said machine, a movable mounting for said device, means for translating the movement of said mounting into pressure, means for producing an initial pressure within said translating means, means for counterbalancing the initial pressure within said translating means, means for measuring the variations in pressure within said movement translating means due to movement of said mounting to indicate changes in the torque of said energy translating device, means for measuring the rise in pressure of fluid passing through said machine, means for measuring the quantity of fluid passing through said machine, and means for simultaneously fixing the readings of all of said measuring means.

8. In a system for determining the operating characteristics of a machine having a fluid passing therethrough, an energy translating device connected with said machine, a movable mounting for said device, means for translating the movement of said mounting into pressure, means for producing an initial pressure within said translating means, a dead weight gauge tester connected with said translating means for counterbalancing the initial pressure within said translating means, manometric means interposed between said translating means and said gauge tester for measuring the variations in pressure within said movement translating means due to movement of said mounting to indicate changes in the torque of said energy translating device, means for measuring the rise in pressure of the fluid pasing through said machine, means for measuring the quantity of fluid passing through said machine, and means for simultaneously fixing the readings of all of said measuring means.

9. In a system for determining the operating characteristics of a machine having a fluid passing therethrough, an energy translating device connected with said machine, a movable mounting for said device, means for translating the movement of said mounting into pressure, means for producing an initial pressure within said translating means, a cylinder connected with said translating means, a piston movable within said cylinder, weights arranged on said piston for counterbalancing the initial pressure within said translating means, manometric means interposed between said translating means and said cylinder for measuring the variations in pressure within said translating means due to movement of said mounting, means for measuring the rise in pressure of the fluid passing through the machine, means for measuring the quantity of fluid passing through said machine, and means for simultaneously fixing the readings of all of said measuring means.

10. In a system for determining the operating characteristics of a machine having a fluid passing therethrough, an energy translating device connected with said machine, a movable mounting for said device, means for translating the movement of said mounting into pressure, means for producing an initial pressure within said translating means, a cylinder connected with said translating means, a piston movable within said cylinder, weights arranged on said piston for counterbalancing the initial pressure within said translating means, a U-tube containing a fluid immiscible with the fluid in said translating means and in said cylinder and having the legs thereof severally connected with said translating means and said cylinder to measure the variations in pressure within said translating means due to movement of said mounting, means for measuring the rise in pressure of the fluid passing through the machine, means for measuring the quantity of fluid passing through said machine, and means for simultaneously fixing the readings of all of said measuring means.

11. In a system for determining the operating characteristics of a machine having a fluid passing therethrough, an energy translating device connected with said machine, manometric means for measuring the torque of said device, manometric means for measuring the rise in pressure of the fluid passing through said machine, manometric means for measuring the quantity of fluid passing through said machine, a plurality of valves severally controlling the application of fluid pressure to all of said manometric means, and means for simultaneously operating said valves to fix the instantaneous positions of all of said manometric means.

12. In a system for determining the operating characteristics of a machine having a fluid passing therethrough, an energy translating device connected with said machine, manometric means for measuring the torque of said device, manometric means for measuring the rise in pressure of the fluid passing through said machine, manometric means for measuring the quantity of fluid passing through said machine, a plurality of valves severally controlling the application of fluid pressure to all of said manometric means, and a common handle for all of said valves for simultaneously fixing the instantaneous positions of the fluid in all of said manometric means.

13. In a dynamometer for determining the value of a force applied to an energy translating device, a platform to receive the energy translating device and substantially frictionlessly movable dependent upon the force applied to the energy translating device, means for converting the movement of said platform into pressure, means for resisting variations in the initial pressure within said movement converting means to retain the movement of said platform within close limits, and means for measuring the variations in pressure responsive to movements of said platform.

14. In a dynamometer for determining the value of a force applied to an energy translating device, a platform to receive the energy translating device and substantially frictionlessly movable dependent upon the force applied to the energy translating device, means for converting the movement of said platform into pressure, means for resisting variations in the initial pressure within said movement converting means to retain the movement of said platform within close limits, means for counterbalancing the initial pressure within said movement converting means, and means for measuring the variations in pressure responsive to movements of said platform.

15. In a dynamometer for determining the value of a force applied to an energy translating device, a platform to receive the energy translating device and substantially frictionlessly movable dependent upon the force applied to the energy translating device, means for converting the movement of said platform into pressure, a fluid pump connected with and providing a source of continuous pressure to said movement converting means for maintaining a pressure therein to retain the movement of said platform within close limits, a valve operated by said platform and controlling the connection of said movement converting means with said pump, and means for measuring the variations in pressure responsive to movements of said platform.

16. In a dynamometer for determining the value of a force applied to an energy translating device, a platform to receive the energy translating device and substantially frictionlessly movable dependent upon the force applied to the energy translating device, means for converting the movement of said platform into pressure, means for resisting variations in the pressure within said movement converting means to retain the movement of said platform within close limits, a cylinder connected with said movement converting means, a piston movable within said cylinder, weights arranged on said piston to counterbalance the initial pressure on said movement converting means, and means interposed between said movement converting means and said cylinder for measuring the variations in pressure responsive to movements of said platform.

17. In a dynamometer for determining the value of a force applied to an energy translating device, a platform to receive the energy translating device and substantially frictionlessly movable dependent upon the force applied to the energy translating device, means for converting the movement of said platform into pressure, means for resisting variations in the initial pressure within said movement converting means to retain the movement of said platform within close limits, means for counterbalancing the initial pressure within said movement converting means, and a manometer connected between said movement converting means and said pressure balancing means to measure the pressure variations responsive to movement of said platform within the predetermined limits thereof.

18. In a dynamometer for determining the value of a force applied to an energy translating device, a platform to receive said energy translating device and substantially frictionlessly movable dependent on the force applied to said energy translating device, means for converting movement of said platform into pressure, and means automatically dependent on the degree of movement of said platform to limit the movement thereof by varying the pressure in said movement converting means.

19. In a dynamometer for determining the value of a force applied to an energy translating device, a platform to receive said energy translating device and substantially frictionlessly movable dependent on the force applied to said energy translating device, a fluid filled cylinder receiving a piston connected with said platform for converting the movement thereof into pressure within said cylinder, and means automatically dependent on the degree of movement of said platform to limit the movement thereof by varying the pressure admitted to said cylinder.

20. In a dynamometer for determining the value of a force applied to an energy translating device, a platform to receive said energy translating device and substantially frictionlessly movable dependent on the force applied to said energy translating device, a fluid filled cylinder receiving a piston connected with said platform for converting the movement thereof into pressure within said cylinder, a valve controlled by movement of said platform to limit the degree of movement thereof by varying the pressure admitted to said cylinder.

21. In a dynamometer for determining the value of a force applied to an energy translating device, a platform to receive said energy translating device and substantially frictionlessly movable dependent on the force applied to said energy translating device, means for converting movement of said platform into pressure, means for supplying fluid pressure to said movement converting means, and means controlling the supply of fluid pressure dependent on the movement of said platform to limit the movement thereof.

22. In a dynamometer for determining the value of a force applied to an energy translating device, a platform to receive said energy translating device and substantially frictionlessly movable dependent on the force applied to said energy translating device, a fluid filled cylinder receiving a piston connected with said platform for converting the movement thereof into pressure within said cylinder, a pump for supplying fluid pressure to said cylinder, and a valve controlled by movement of said platform to limit the degree of movement thereof by varying the pressure admitted to said cylinder.

23. In a dynamometer for determining the value of a force applied to an energy translating device, a platform to receive said energy translating device and substantially frictionlessly movable dependent on the force applied to said energy translating device, means for converting movement of said platform into pressure, means for supplying fluid pressure to said movement converting means, means for counterbalancing the pressure supplied to said movement converting means, and means controlling the supply of fluid pressure dependent on the movement of said platform to limit the movement thereof.

24. In a dynamometer for determining the value of a force applied to an energy translating device, a platform to receive said energy translating device and substantially frictionlessly movable dependent on the force applied to said energy translating device, means for converting movement of said platform into pressure, means for supplying fluid pressure to said movement converting means, a dead weight gauge tester connected with and counterbalancing the pressure supplied to said movement converting means, and means controlling the supply of fluid pressure dependent on the movement of said platform to limit the movement thereof.

25. In a dynamometer for determining the value of a force applied to an energy translating device, a platform to receive said energy translating device and substantially frictionlessly movable dependent on the force applied to said energy translating device, a fluid filled cylinder receiving a piston connected with said platform for converting the movement thereof into pressure within said cylinder, a pump for supplying fluid pressure to said cylinder, a dead weight gauge tester connected with and counterbalancing the pressure supplied to said cylinder, and a valve controlled by movement of said platform to limit the degree of movement thereof by varying the pressure admitted to said cylinder.

26. In a dynamometer for determining the value of a force applied to an energy translating device, a platform to receive the energy translating device and substantially frictionlessly movable dependent on the force applied to the energy translating device, means for converting the movement of said platform into pressure, means for supplying fluid under pressure to said movement converting means, means for controlling the connection of said movement converting means with said pressure supply means dependent on the movement of said platform, means for counterbalancing at least a portion of the pressure present in said movement converting means, and means for measuring the pressure changes in said movement converting means and acting on said counterbalancing means.

27. In a dynamometer for determining the value of a force applied to an energy translating device, a platform to receive the energy translating device and substantially frictionlessly movable dependent on the force applied to the energy translating device, a fluid filled cylinder receiving a piston connected with said platform for converting the movement thereof into pressure within said cylinder, a pump for supplying fluid under pressure to said cylinder, a valve controlled by movement of said platform to control the connection of said cylinder and said pump to limit the degree of movement of said platform, a dead weight gauge tester connected with and counterbalancing a portion of the pressure supplied to said cylinder, and a manometer connected between said cylinder and said gauge tester for measuring the pressure changes occurring in said cylinder beyond the pressures counterbalanced by said gauge tester.

WILLIAM M. WHITE.